United States Patent
Goto et al.

(10) Patent No.: US 7,810,608 B2
(45) Date of Patent: Oct. 12, 2010

(54) STEERING APPARATUS FOR VEHICLE

(75) Inventors: Takeshi Goto, Toyota (JP); Yutaka Onuma, Nishikamo-gun (JP); Ryuuichi Kurosawa, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 761 days.

(21) Appl. No.: 11/663,669

(22) PCT Filed: May 29, 2006

(86) PCT No.: PCT/JP2006/311146

§ 371 (c)(1),
(2), (4) Date: Mar. 23, 2007

(87) PCT Pub. No.: WO2007/032129

PCT Pub. Date: Mar. 22, 2007

(65) Prior Publication Data

US 2008/0142293 A1    Jun. 19, 2008

(30) Foreign Application Priority Data

Sep. 16, 2005    (JP) ............................ 2005-269793

(51) Int. Cl.
*B62D 5/04*    (2006.01)
(52) U.S. Cl. ...................... 180/446; 180/402; 180/403; 180/443
(58) Field of Classification Search ................ 180/402, 180/403, 443, 444, 446
See application file for complete search history.

(56) References Cited

U.S. PATENT DOCUMENTS

| 6,524,203 | B2 * | 2/2003 | Kawamoto et al. | 474/144 |
| 6,935,453 | B2 * | 8/2005 | Mizuta et al. | 180/235 |
| 7,377,342 | B2 * | 5/2008 | Miyazaki et al. | 180/62 |
| 2004/0016594 | A1 * | 1/2004 | Yasui et al. | 180/446 |

FOREIGN PATENT DOCUMENTS

| JP | 2002-211427 | 7/2002 |
| JP | 2003-154962 | 5/2003 |
| JP | 2003-252229 | 9/2003 |
| JP | 2005-247056 | 9/2005 |

* cited by examiner

*Primary Examiner*—Lesley Morris
*Assistant Examiner*—Jacob Knutson
(74) *Attorney, Agent, or Firm*—Oblon, Spivak, McClelland, Maier & Neustadt, L.L.P.

(57) ABSTRACT

An electronic control unit inputs a side slip angle $\beta$ of a vehicle body. The unit calculates a dynamic zero point $\delta o$ for reducing a lateral force generated in the vehicle due to the side slip angle $\beta$ of the vehicle body. The unit calculates a steering angle $\delta a$, which is represented by the difference between the dynamic zero point $\delta o$ and a steering angle $\delta$ detected by a steering angle sensor. The unit calculates a reaction torque $Tz$ having a predetermined relation with the steering angle $\delta a$. The unit drives and controls an electric motor to generate the calculated reaction torque $Tz$. Thus, the unit guides a driver to a proper steering-wheel rotating direction.

16 Claims, 5 Drawing Sheets

STEERING APPARATUS FOR VEHICLE

TECHNICAL FIELD

The present invention relates to a steering apparatus for a vehicle which includes a steering wheel rotated by a driver, a steering shaft which rotates together with the steering wheel, a steering unit which mutually connects the steering shaft and steerable wheels of the vehicle and steers the steerable wheels in accordance with the rotation of the steering shaft, and an electric motor for imparting a predetermined torque to the steering operation of the steerable wheels.

BACKGROUND ART

In recent years, there has been actively developed a steering apparatus for a vehicle which can impart a proper feedback to a steering wheel at all times irrespective of the traveling environment of the vehicle; in particular, even when the vehicle travels on a snowy road, an icy road, or a like road which provides a small road-surface reaction force. For example, Japanese Patent Application Laid-Open (kokai) No. 2002-211427 discloses an electric power steering control apparatus which imparts proper reaction torque to the steering wheel in accordance with the travel environment. This electric power steering control apparatus includes a steering angle sensor for detecting a steering angle of the steering wheel, a reaction torque sensor for detecting reaction torque of the steering system, and a superimposing reaction torque calculation section which calculates a superimposing reaction torque in the returning direction of the steering wheel by multiplying, by a gain, the steering angle detected by means of the steering angle sensor. The apparatus controls the gain so as to decrease the superimposing reaction torque when the reaction torque of the steering system is large, and increase the superimposing reaction torque when the reaction torque of the steering system is small.

However, the conventional electric power steering control apparatus is designed such that when the driver performs a proper steering operation, the apparatus imparts to the steering wheel a proper feedback; i.e., a superimposing reaction torque in response to a small reaction torque. There, in a case where the driver performs an unreasonable steering operation or carelessly performs an excessive steering operation in a travel environment where a small reaction force is provided by the road surface, the side slip angle of the steerable wheels increases, with a resultant sharp drop in the self-aligning torque of the steerable wheels, possibly resulting in failure to obtain the small reaction torque from the road surface. In a situation where such a small reaction torque is not obtained, generation of a proper superimposing reaction torque becomes difficult, with the result that the driver cannot obtain any feedback from the steering wheel during driving, and in some cases cannot drive the vehicle at will.

In order to cope with this problem, there is proposed a steering-reaction-force control apparatus which controls steering reaction generated against steering operation of the driver, as disclosed in, for example, Japanese Patent Application Laid-Open (kokai) No. 2003-154962. This steering-reaction-force control apparatus includes steering means (e.g., an electric power steering apparatus) capable of steering the steerable wheels (turnable wheels), an actuator capable of adding an operational force to the steering means, and side-slip angle detection means for detecting side slip angle of the steerable wheels (turnable wheels) in relation to the road surface. In order to impart a steering reaction to the steering means in response to generation of a side slip angle, the apparatus controls the actuator to generate the steering reaction in a direction in which the side slip angle of the steerable wheels (turnable wheels) is generated and to increase the steering reaction as the side slip angle increases.

According to this steering-reaction-force control apparatus, through detection of the side slip angle of the steerable wheels, the operation of the actuator can be controlled in consideration of a sharp drop in the self-aligning torque generated when the side slip angle of the steerable wheels is large. By virtue of this control, even in a travel environment in which the feedback or response to the rotation of the steering wheel decreases due to a sharp drop in the self-aligning torque, a steering reaction which increases with the side slip angle of the steerable wheels can be generated separately and applied to the steering wheel. Accordingly, even in a case where the side slip angle of the steerable wheels is large, the driver can feel a proper steering reaction.

DISCLOSURE OF THE INVENTION

Incidentally, during travel on a snowy or icy road, where the reaction force from the road surface is small, it is important to know the steering direction for stabilizing the turning behavior of the vehicle, in addition to the present direction of the steerable wheels (steering direction). In this regard, each of the above-described apparatuses can properly obtain a reaction torque (steering reaction) from the road surface if the side slip angle of the steerable wheels is within an allowable range. As a result, even on a slippery road, so long as the driver performs proper steering, the driver can know the present direction of the steerable wheels on the basis of the reaction torque (steering reaction) imparted to the steering wheel, whereby the driver can drive the vehicle. However, in either apparatus, the driver can sense only the present steering direction of the steerable wheels from the reaction torque (steering reaction) imparted to the steering wheel on the basis of the road surface reaction, but cannot sense the steering direction for stabilizing the turning behavior of the vehicle. In particular, for a driver who is not well acquainted with driving of a vehicle, it is important to sense, without fail, the steering direction of the steerable wheels for stabilizing the turning behavior of the vehicle.

The present invention has been accomplished to solve the above-described problem, and an object of the present invention is to provide a steering apparatus for a vehicle which guides a driver to a steering direction for stabilizing the behavior of the vehicle during turning, in consideration of a side slip angle of the vehicle body generated when the vehicle is in a turning state.

In order to achieve the above-described object, the present invention provides a steering apparatus for a vehicle which includes a steering wheel rotated by a driver, a steering shaft which rotates together with the steering wheel, a steering unit which mutually connects the steering shaft and steerable wheels of the vehicle and steers the steerable wheels in accordance with rotation of the steering shaft, and an electric actuator which applies a predetermined torque to the steering operation of the steerable wheels, the steering apparatus being characterized by comprising steering angle detection means for detecting a steering angle of the steerable wheels which are steered in accordance with rotation of the steering wheel based on a first reference for maintaining the vehicle in a straight travel state; side-slip-angle detection means for detecting a side slip angle of the body of the vehicle generated when the vehicle is in a turning state; reference-point calculation means for calculating a second reference point which changes in accordance with the detected side slip angle of the vehicle body and is used for determining a steering angle for causing the vehicle to turn while reducing an influence of a lateral force on the turning state of the vehicle, the lateral force being generated in the vehicle due to the side slip angle of the vehicle body; steering angle conversion means for converting the steering angle of the steerable wheels detected by the steering angle detection means on the basis of the first reference point to a steering angle based on the second reference point; reaction-torque calculation means for calculating a reaction torque which is a torque having a predetermined relation with the steering angle obtained through the conversion and acting in a direction for causing the steering angle obtained through the conversion to coincide with the second reference point; and drive-control means for rotating and driving the electric motor so as to generate the calculated reaction torque.

By virtue of the above configuration, the reference-point calculation means can calculate the second reference point (dynamic zero point) in ration to the first reference point (static zero point), the second reference point changing in accordance with the side slip angle of the vehicle body detected by the side-slip-angle detection means. The calculated second reference point is a reference point for determining a steering angle at which the vehicle can stably turn while reducing a lateral force which affects the turning state of the vehicle due to the side slip angle of the vehicle body. The steering angle conversion means can convert the steering angle of the steerable wheels detected by the steering angle detection means on the basis of the first reference point to a steering angle based on the second reference point (that is, can change the reference point used for detection of the steering angle). The reaction-torque calculation means can calculate a reaction torque having a predetermined relation with the steering angle obtained through the conversion. This reaction torque is a torque acting in a direction for causing the steering angle obtained through the conversion to coincide with the second reference point. The drive-control means can drive and control the electric motor such that the calculated reaction torque is generated.

By means of generating the reaction torque in this manner, the steerable wheels are steered to the second reference point, and the steering wheel, which is integrally assembled to the steering shaft connected to the steering unit, is rotated (guided) toward a direction corresponding to the second reference point. With this operation, for example, even when the vehicle travels on a snowy road, an icy road, or a like road which provides a small road surface reaction force, it is possible to generate a reaction torque which a driver can sense without fail, and to guide the driver to a direction to which the driver must rotate the steering wheel, by means of the generated reaction torque. Accordingly, in particular, even when a driver who is not well-acquainted with driving a vehicle travels on a snowy road or an icy road, the driver can easily determine the direction in which the steering wheel is to be rotated so as to stabilize the behavior of the vehicle in a turning state; i.e., the direction of a rotating operation toward the second reference point. This enables the driver to properly correct the operation of rotating the steering wheel so as to stabilize the behavior of the vehicle during turning, and to quite easily cause the vehicle to turn while traveling.

Preferably, the reference-point calculation means calculates the second reference point by multiplying the detected side slip angle of the vehicle body by a coefficient and a correction term, where the coefficient is calculated by use of cornering powers acting toward a turning center of the vehicle on the basis of friction forces between a road surface and tires attached to the front and rear wheels of the vehicle in the turning state, and the correction term is determined in consideration of the deforming characteristic of the tires, which changes non-linearly with the detected side slip angle of the vehicle body. Preferably, the correction term is determined in accordance with a lateral acceleration of the vehicle detected by lateral-acceleration detection means for detecting the lateral acceleration of the vehicle.

By virtue of this configuration, the second reference point can be calculated through multiplication of the side slip angle of the vehicle body by a coefficient calculated by use of cornering powers acting toward the turning center of the vehicle, and a correction term determined in consideration of the deforming characteristic of the tires which changes non-linearly with the side slip angle of the vehicle body. The correction term can be changed in accordance with the detected lateral acceleration of the vehicle. Thus, it becomes possible to optimally calculate the second reference point in accordance with the turning state of the vehicle; i.e., the generated side slip angle of the vehicle body, whereby the steerable wheels and the steering wheel are guided toward the second reference point, and thus, the driver can quite easily cause the vehicle to turn, while traveling, in a more stable manner.

Moreover, preferably, the reference-point calculation means calculates the second reference point by multiplying the detected side slip angle of the vehicle body by a coefficient which uses cornering powers acting toward a turning center of the vehicle which are calculated in consideration of a lateral acceleration generated when the vehicle is in a turning state, a roll angle representing the degree of rolling occurred as a result of turning of the vehicle, and an amount of a load shift due to the rolling occurred in the vehicle body. With this configuration, cornering powers which properly reflect the turning state of the vehicle can be calculated quite accurately, and the second reference point can be calculated from the coefficient using the cornering powers and the detected side slip angle $\beta$. Accordingly, it is possible to quite accurately calculate the second reference point for determining a steering angle which reduces the lateral force affecting the turning state of the vehicle due to the side slip angle generated in the vehicle body to thereby enable the vehicle to turn stably.

Preferably, the predetermined relation between the reaction torque and the steering angle obtained through the conversion is a relation in which the reaction torque increases with an increase in the absolute value of the steering angle obtained through the conversion. In this case, preferably, the predetermined relation between the reaction torque and the steering angle obtained through the conversion is such that the reaction torque changes in proportion to a change in the absolute value of the steering angle obtained through the conversion. By virtue of this configuration, when the turning behavior of the vehicle becomes unstable in a situation where the absolute value of the steering angle obtained through the conversion is large; i.e., where the difference between the second reference point and the steering angle detected on the basis of the first reference point is large, a large reaction torque can be generated. Since the steerable wheels are steered and the rotation direction of the steering wheel is guided by means of the generated large reaction torque, the driver can quickly and properly correct the steering-wheel rotating operation.

Further, the predetermined relation can be determined irrespective of the road surface reaction force. Therefore, the reaction torque can be increased in relation to the magnitude of the absolute value of the steering angle obtained through the conversion in such a manner that the driver can easily steer the steering wheel; in other words, the driver can easily control the turning state of the vehicle. With this control, the predetermined relation can be determined such that the reaction torque increases to a greater degree in relation to the magnitude of the absolute value of the steering angle obtained through the conversion, in accordance with the characteristic of the vehicle. For example, in the case of a sporty vehicle, the reaction torque is increased to a greater degree in relation to the magnitude of the absolute value of the steering angle so as to enable quick correction of the steering-wheel rotating operation during sporty driving. Therefore, the driver can quickly and properly correct the steering-wheel rotating operation.

Furthermore, when the predetermined relation is such that the reaction torque increases with an increase in the absolute value of the steering angle obtained through the conversion, it is possible to employ a relation in which the reaction torque increases slightly when the difference between the first reference point and the calculated second reference point is small (that is, when the side slip angle of the vehicle body is small), and employ a relation in which the reaction torque increases greatly when the difference is large (that is, when the side slip angle of the vehicle body is large). By virtue of this configuration, a small reaction torque can be generated during an ordinary travel, because the generated side slip angle of the vehicle body is small. Thus, the driver can drive without feeling an unnatural sensation. Meanwhile, in a case where an unexpected large side slip angle of the vehicle body is generated during high-speed travel or the like and the turning behavior of the vehicle becomes unstable, a larger reaction torque can be generated, whereby the driver can quickly correct the steering-wheel rotating operation.

Another feature of the present invention resides in that the steering shaft is composed of a steering input shaft which rotates together with the steering wheel and a steering output shaft connected to the steering unit; and the steering input shaft and the steering output shaft are connected by a variable gear mechanism which changes a rotational amount of the steering output shaft in relation to a rotational amount of the steering input shaft. By virtue of this configuration, when the steerable wheels are steered by the reaction torque; i.e., when the steering wheel is guided by the reaction torque, the direction in which the steering wheel must be rotated can be guided, while the rotational amount of the steering wheel is reduced, so that the unnatural sensation that the drive feels can be mitigated.

BEST MODE FOR CARRYING OUT THE INVENTION

Figure 1:
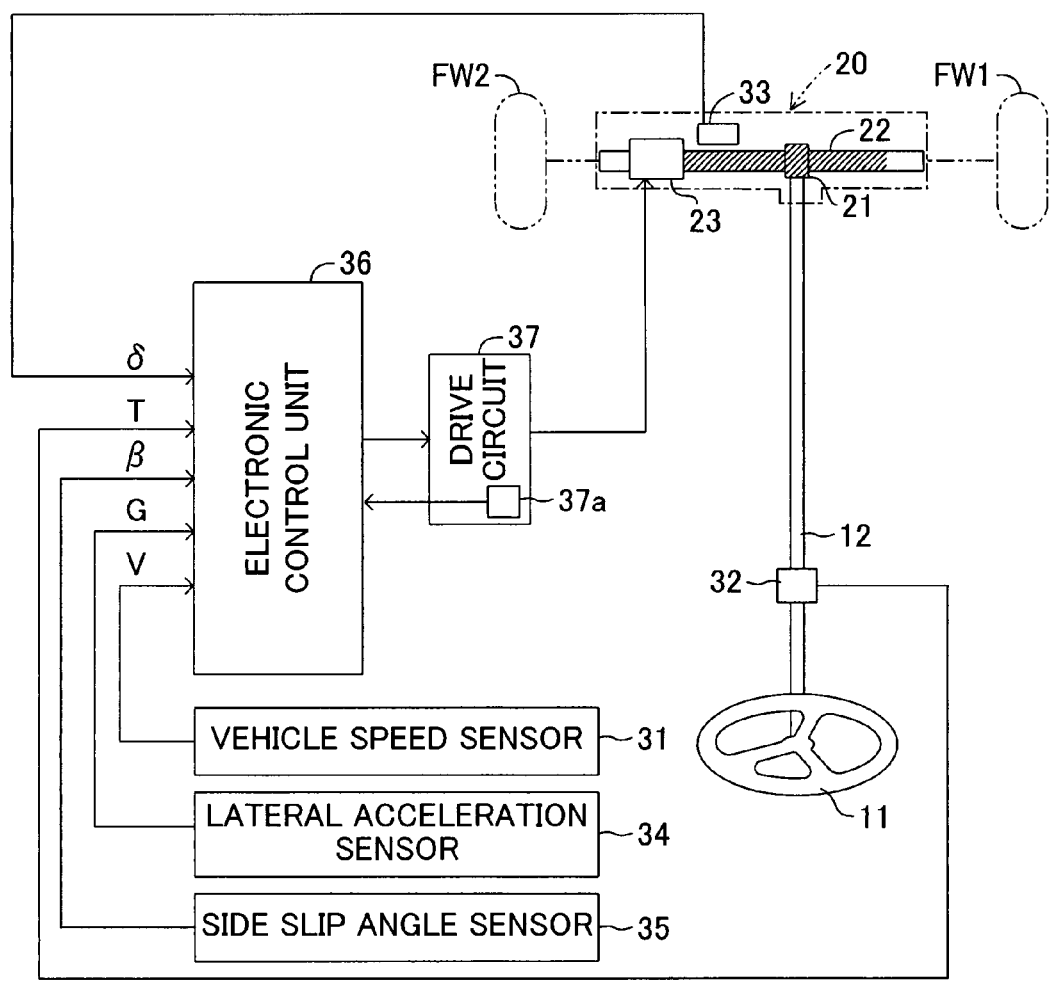
FIG. 1 is a schematic diagram of a steering apparatus for a vehicle according to an embodiment of the present invention.

Below, a steering apparatus for a vehicle according to an embodiment of the present invention will be described in detail with reference to the drawings. FIG. 1 schematically shows an electric power steering apparatus, which serves as the steering apparatus for a vehicle according to the embodiment.

This electric power steering apparatus includes a steering wheel 11 which a driver rotates so as to steer left and right front wheels FW1 and FW2, which are steerable wheels. The steering wheel 11 is fixed to an upper end of a steering shaft 12, and a lower end of the steering shaft 12 is connected to a steering gear unit 20.

The steering gear unit 20 is, for example, a rack-and-pinion-type gear unit, and is designed such that rotation of a pinion gear 21 integrally mounted to the lower end of the steering shaft 12 is transmitted to a rack bar 22. Further, an electric motor 23 is provided in the steering gear unit 20. The electric motor 23 generates a torque for reducing a steering toque t which the driver inputs by rotating the steering wheel 11 (hereinafter this torque will be referred to as "assist torque Ta) and also generates a generally equal torque in a direction against the steering torque t (hereinafter this torque will be referred to as "reaction torque Tz). This electric motor 23 is assembled in such a manner that the generated assist and reaction torques Ta and Tz are transmitted to the rack bar 22. With this configuration, the steering torque t input from the steering wheel 11 to the steering shaft 12 is transmitted to the rack bar 22 via the pinion gear 21, and the assist and reaction torques Ta and Tz generated by the electric motor 23 are transmitted to the rack bar 22. Upon receipt of these torques transmitted in this manner, the rack bar 22 moves axially, and the left and right front wheels FW1 and FW2 connected to opposite ends of the rack bar 22 are steered to the left or right.

Next, an electric controller for controlling operation of the electric motor 23 will be described. The electric controller includes a vehicle speed sensor 31, a steering torque sensor 32, a steering angle sensor 33, a lateral acceleration sensor 34, and a side slip angle sensor 35. The vehicle speed sensor 31 detects speed of the vehicle, and outputs it as a vehicle speed V. The steering torque sensor 32 is assembled to the steering shaft 12 and adapted to detect torque T input to the steering shaft 12 and to output the same. Notably, the torque T assumes a positive value when the torque rotates the steering wheel 12 in the counterclockwise direction as viewed in the heading direction of the vehicle, and assumes a negative value when the torque rotates the steering wheel 12 in the clockwise direction.

The steering angle sensor 33 is assembled to the steering gear unit 20, and adapted to detect a displacement of the rack bar 22 in the axial direction, and to output a steering angle δ of the left and right front wheels FW1 and FW2 corresponding to the detected displacement. The steering angle sensor 33 uses, as a reference, the neutral position of the rack bar 22 (hereinafter referred to as a static zero point), at which the left and right front wheels FW1 and FW2 are not steered and the vehicle travels straight ahead. Thus, the steering angle sensor 33 outputs the steering angle δ which corresponds to the static zero point as "0." The steering angle sensor 33 outputs the steering angle δ as a positive value when it detects a displacement of the rack bar 22 from the static zero point in the rightward direction as viewed in the heading direction of the vehicle; i.e., the left and right front wheels FW1 and FW2 steered to the left, and outputs the steering angle δ as a negative value when it detects a displacement of the rack bar 22 from the static zero point in the leftward direction; i.e., the left and right front wheels FW1 and FW2 steered to the right. The lateral acceleration sensor 34 detects and outputs a lateral acceleration G generated in the vehicle. The lateral acceleration sensor 34 outputs a leftward lateral acceleration as viewed in the heading direction of the vehicle as a positive value, and a rightward lateral acceleration as a negative value.

The side slip angle sensor 35 detects a side slip angle β generated in the vehicle body of the vehicle in a turning state, and outputs the same. When the side slip angle β is negative, it represents a leftward side slip angle with respect to the heading direction of the vehicle, and when the side slip angle β is positive, it represents a rightward side slip angle with respect to the heading direction of the vehicle. Although various methods can be employed to detect the side slip angle β of the vehicle body, preferably, the side slip angle β is detected as follows. That is, when a vehicle speed along the fore-aft direction of the vehicle is represented by Vx and a vehicle speed along the lateral direction of the vehicle is represented by Vy, the side slip angle β of the vehicle body can be calculated in accordance with the following Eq. 1.

$$\beta = \tan^{-1}(Vy/Vx) \quad \text{Eq. 1}$$

Notably, the vehicle speeds Vx and Vy are preferably detected by use of detectors utilizing, for example, light or sound.

These sensors 31 to 35 are connected to an electronic control unit 36. The electronic control unit 36 includes, as a main component, a microcomputer composed of a CPU, ROM, RAM, etc., and controls the drive of the electric motor 23 of the steering gear unit 20 through execution of a program by use of respective detection values of the sensors 31 to 35. Therefore, a drive circuit 37 for driving the electric motor 23 is connected to the output side of the electronic control unit 36. A current detector 37a for detecting drive current flowing through the electric motor 23 is provided in the drive circuit 37. The drive current detected by means of the current detector 37a is fed back to the electronic control unit 36 so as to control the drive of the electric motor 23.

Figure 2:
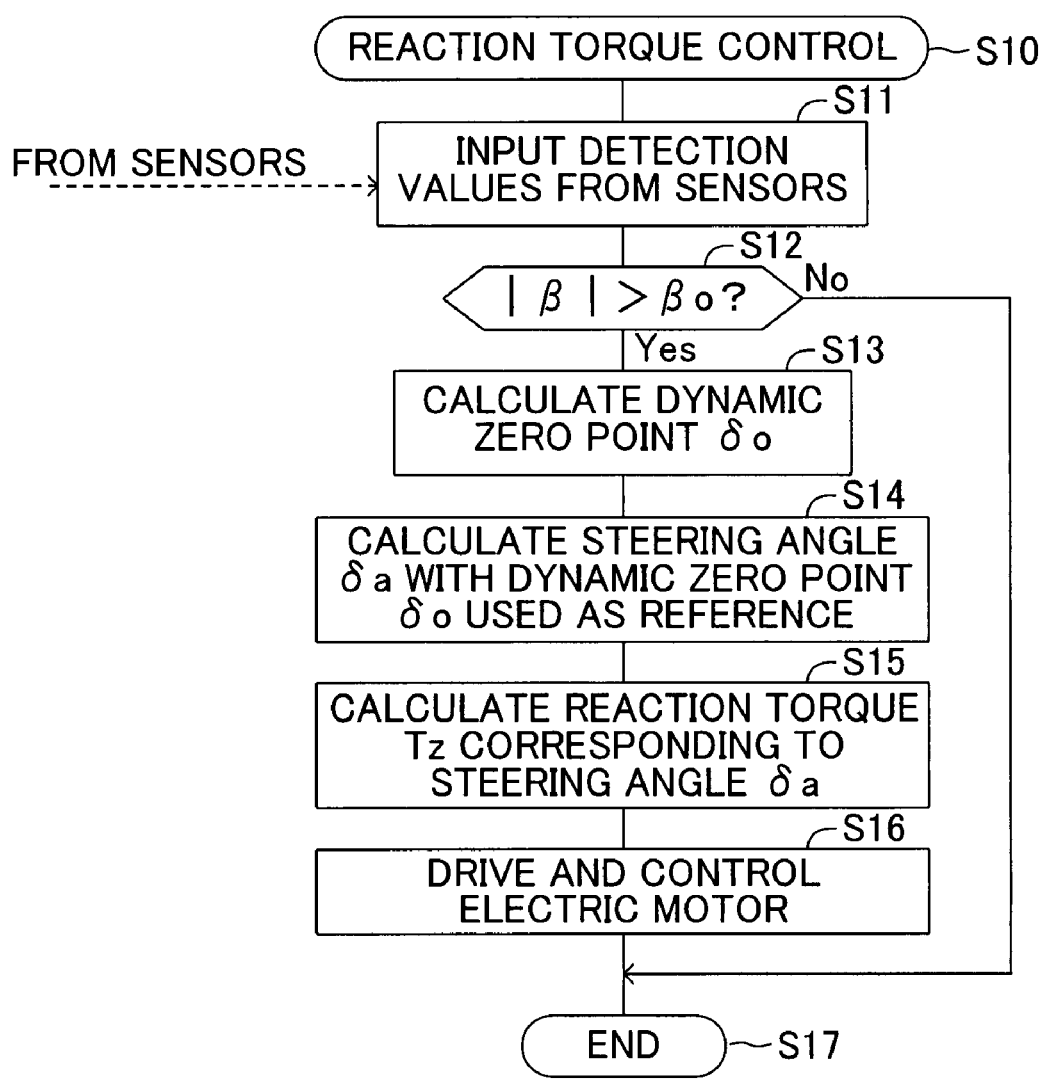
FIG. 2 is a flow chart showing a zero-point changing program executed by an electronic control unit of FIG. 1.

Next, operation of the electric power steering apparatus according to the present embodiment having the above-described configuration will be described in detail. When an unillustrated ignition switch is turned on by the driver, the electronic control unit 36 (more specifically, the CPU) repeatedly executes a reaction-torque control program shown in FIG. 2 at predetermined, short intervals.

That is, the electronic control unit 36 starts the reaction-torque control program in step S10, and proceeds to step S11 so as to input the respective values detected by means of the vehicle speed sensor 31, the steering angle sensor 33, the lateral acceleration sensor 34, and the side slip angle sensor 35; i.e., vehicle speed V, steering angle δ, lateral acceleration G, and side slip angle β of the vehicle body. After input of the detection values from the sensors 31, 33, 34, and 35, the electronic control unit 36 proceeds to step S12.

In step S12, the electronic control unit 36 determines whether or not the absolute value of the side slip angle β input in the above-described step S11 is greater than a preset, small, positive vehicle-body side slip angle βo. Here, the vehicle-body side slip angle βo is a value used to determine whether the turning behavior of the vehicle deteriorates because of the side slip angle β generated in the vehicle body. That is, when the side slip angle β is greater than the predetermined vehicle-body side slip angle βo, the turning behavior of the vehicle having deteriorated because of the generated side slip angle β must be corrected. Therefore, the electronic control unit 36 makes a "Yes" determination, and proceeds to step S13.

Meanwhile, when the side slip angle β is equal to or less than the predetermined vehicle-body side slip angle βo, the turning behavior of the vehicle is not required to be corrected. Therefore, the electronic control unit 36 makes a "No" determination, and proceeds to step S17 so as to end the current execution of the reaction-torque control program.

In this case, in accordance with the torque T (i.e., steering torque t) detected by the steering torque sensor 32, the electronic control unit 36 causes the electric motor 23 to generate a predetermined assist torque Ta in the same direction as that of the steering torque t input through rotation of the steering wheel 11. The assist torque Ta is set such that it increases as the detected vehicle speed V decreases, and decreases as the detected vehicle speed V increases. The assist torque Ta generated by the electric motor 23 is transmitted to the rack bar 22.

As a result, in addition to the steering torque t input by the driver, the assist torque Ta generated by the electric motor 23 is transmitted to the rack bar 22, whereby the steering torque t required to steer the left and right front wheels FW1 and FW2 is reduced greatly. Therefore, the driver can steer the left and right front wheels FW1 and FW2 quite easily by rotating the steering wheel 11. Upon elapse of the predetermined, short interval, the electronic control unit 36 again starts the execution of the reaction-torque control program in step S10.

In step S13, in relation to the above-described static zero point serving as the first reference point, the electronic control unit 36 calculates a dynamic zero point δo, which serves as a second reference point and is used to stabilize the turning behavior of the vehicle in consideration of the influence of the side slip angle β generated in the vehicle body. In the following, calculation of this dynamic zero point δo will be described in detail.

First, the influence of the vehicle-body side slip angle β on the turning behavior of the vehicle will be described for the case where the left and right front wheels FW1 and FW2 are steered to a steering angle δc, for example, with the static zero point used as a reference. When the steering wheel 11 is rotated by the driver, the rack bar 22 of the steering gear unit 20 moves axially, so that the left and right front wheels FW1 and FW2 are steered to the steering angle δc. As a result, the vehicle changes its state from a straight travel state to a turning state, or maintains the turning state. A centrifugal force generated as a result of turning and a centripetal force generated toward the center of the turning act on the vehicle in the turning state. The centripetal force acting on the vehicle in the turning state is provided by a lateral force which acts toward the turning center between the road surface and the front and rear wheels of the vehicle (more specifically, tires attached to the front and rear wheels) (hereinafter this lateral force will be referred to as cornering force).

Specifically, when the vehicle travels along a predetermined turning circle determined on the basis of the steering angle δc of the left and right front wheels FW1 and FW2 (hereinafter, this traveling direction will be referred to as the "heading direction"), the tires slip sideways with respect to the heading direction. As result of the side slippage of the tires, the vehicle obtains a generated centripetal force, and thus travels along the turning circle. Therefore, the vehicle body in the turning state has a side slip angle β, which is represented by the angle difference between the heading direction and the fore-aft direction of the vehicle body. Incidentally, since the front and rear wheels are integrally mounted to the vehicle body, in a state in which the vehicle body has a side slip angle β, the tires of the front and rear wheels are apt to displace in relation to the road surface in the direction of the inertial force acting on the vehicle.

However, when the tires of the front and rear wheels are apt to displace in relation to the road surface, friction forces are generated between the tires of the front and rear wheels and the road surface, so that the vehicle travels on the turning circle in the heading direction, rather than in the direction of application of the inertial force. In other words, a cornering force is generated on the basis of the friction forces, and, because of the generated cornering force, a centripetal force which causes the vehicle to travel in the heading direction is generated. As a result of the generated cornering forces of the left and right front wheels FW1 and FW2 (more specifically, the tires of the left and right front wheels FW1 and FW2) being transmitted to the steering wheel 11, the driver can sense the reaction torque, and also can sense the present steering direction (i.e., the steering angle δc) of the left and right front wheels FW1 and FW2.

Accordingly, the centripetal force of the vehicle whose left and right front wheels FW1 and FW2 have been steered to the steering angle δc and which is in a turning state can be calculated by means of the following Eq. 2, which uses cornering forces generated at the front and rear wheels; more specifically, cornering power, which is cornering force per unit side slip angle β.

$$M·α=2·Kf·δc+2·(Kf+Kr)·β+ε \qquad \text{Eq. 2}$$

M in Eq. 2 is the mass of the vehicle. α in Eq. 2 is an acceleration toward the turning center (hereinafter, this acceleration will be referred to as "centripetal acceleration"), and can be represented by the following Eq. 3

$$α=V^2·(1/R) \qquad \text{Eq. 3}$$

In Eq. 3, R represents a turning radius of the vehicle determined on the basis of the steering angle δc, and 1/R represents the curvature of the turning circle (the so-called turning curvature).

The relation shown in the following Eq. 4 holds between the steering angle δc and the turning curvature 1/R.

$$δc=L·(1+A·V^2)·(1/R) \qquad \text{Eq. 4}$$

L in Eq. 4 is a predetermined value representing the wheel base of the vehicle, and A is a predetermined value representing the stability of behavior of the vehicle. Through manipulation of Eq. 4, the turning curvature 1/R can be represented by the following Eq. 5.

$$1/R=δc/(L·(1+A·V^2)) \qquad \text{Eq. 5}$$

Accordingly, the centripetal acceleration a can be represented by the following Eq. 6, which is obtained by substituting Eq. 5 for the above-described Eq. 3.

$$α=(V^2/(L·(1+A·V^2)))·δc \qquad \text{Eq. 6}$$

In the right side of the above-described Eq. 2, Kf represents a cornering power generated at the left and right front wheels FW1 and FW2, and Kr represents a cornering power generated at the rear wheels. Further, as described above, when the steering angle δc is positive; i.e., when the vehicle is turning leftward, a rightward side slip angle is generated, so that the side slip angle β of the vehicle body assumes a positive value, and when the steering angle δc is negative; i.e., when the vehicle is turning rightward, a leftward side slip angle is generated, so that the side slip angle β of the vehicle body assumes a negative value. Notably, on the right side of the above-described Eq. 2, ε is a very small force generated in association with a yaw rate generated when the vehicle turns, and therefore can be ignored. Accordingly, the centripetal force of the vehicle in a turning state can be represented by the following Eq. 7 in place of the above-described Eq. 2.

$$M·α=2·Kf·δc+2·(Kf+Kr)·β \qquad \text{Eq. 7}$$

According to Eq. 7, the centripetal force M·α generated in the vehicle is calculated through summing a lateral force proportional to the steering angle δc of the left and right front wheels FW1 and FW2 (hereinafter, this lateral force will be referred to as "steering lateral force") and a lateral force proportional to the side slip angle β of the vehicle body (hereinafter, this lateral force will be referred to as "slip lateral force"). Incidentally, as is apparent from Eq. 7, the slip lateral force is naturally generated in a state in which the side slip angle β is generated in the vehicle body, and is difficult for the driver to directly control via the steering wheel 11. As a result of the natural generation of the slip lateral force, there is generated a centripetal force which is greater than a centripetal force which the driver expects to be generated through rotation of the steering wheel 11.

As a result, the vehicle fails to turn with a turning radius which the driver has expected. Therefore, the driver must correct the steering angle δc by properly rotating the steering wheel 11 such that the vehicle turns with the expected turning radius (hereinafter this rotating operation will be referred to as "correction steering"). That is, the driver must perform the correction steering of the steering wheel 11 such that the centripetal force M·α decreases by an amount corresponding to a slip lateral force which will be naturally generated as a result of turning of the vehicle. As described above, the naturally generated side slip angle β of the vehicle body affects the turning behavior of the vehicle whose left and right front wheels FW1 and FW2 have been steered to the steering angle δc.

Accordingly, in step S13, the electronic control unit 36 calculates a dynamic zero point δo for stabilizing the turning behavior of the vehicle by eliminating the influence of the slip lateral force (more specifically, the side slip angle β of the vehicle body) naturally generated in the vehicle in a turning state.

Specifically, as described above, in a state in which the side slip angle β of the vehicle body is generated as a result of the left and right front wheels FW1 and FW2 being steered to the steering angle δc, the centripetal force M·α is calculated in accordance with the above-described Eq. 7; that is, by adding the slip lateral force to the steering lateral force. In other words, only the steering lateral force is required to turn the vehicle in accordance with rotation of the steering wheel 11, and the slip lateral force is unnecessary. Accordingly, when the steering angle which causes the vehicle to turn with an expected turning radius which the driver has determined by rotating the steering wheel 11 is referred to as a target steering angle δd, the steering lateral force generated by the steering angle δd can be represented by the following Eq. 8, which is obtained by subtracting the slip lateral force from both sides of the above-described Eq. 7.

$$2·Kf·δd=M·α-2·(Kf+Kr)β \qquad \text{Eq. 8}$$

Thus, the target steering angle δd can be calculated in accordance with the following Eq. 9, which is obtained by manipulating Eq. 8.

$$δd=(M/(2·Kf))·α-(1+Kr/Kf)·β \qquad \text{Eq. 9}$$

The following Eq. 10 can be obtained by modifying Eq. 9 by use of the above-described Eq. 6.

$$δd=(M/(2·Kf)·(V^2/(L·(1+A·V^2)))·δc-(1+Kr/Kf)·β \qquad \text{Eq. 10}$$

Since the first term of the right-hand side of Eq. 10 changes in accordance with the steering angle δc, which is input through rotation of the steering wheel 11 by the driver, Eq. 10 can be rewritten as shown in the following Eq. 11 by means of replacing that term with a steering angle δc1 input by the driver.

$$\delta d = \delta c1 - (1 + Kr/Kf) \cdot \beta \qquad \text{Eq. 11}$$

According to Eq. 11, the target steering angle δd is determined by subtracting the term proportional to the side slip angle β of the vehicle body from the term associated with the steering angle δc1 input through rotation of the steering wheel 11 by the driver. Therefore, when the driver performs the above-described correction steering, the driver rotates the steering wheel 11 such that the steering angle coincides with the target steering angle δd determined in accordance with Eq. 9. In other words, the steered direction of the left and right front wheels FW1 and FW2 for stabilizing the turning behavior of the vehicle, while eliminating the influence of the side slip angle β generated in the vehicle body of the vehicle in a turning state, coincides with a direction of the left and right front wheels FW1 and FW2 (i.e., the rack bar 22) steered back in the direction of generation of the side slip angle β by an angle represented by $(1+Kr/Kf) \cdot \beta$.

This is equal to a control performed for the vehicle in a turning state so at to move the neutral position (static zero point) of the rack bar 22 by $(1+Kr/Kf) \cdot \beta$ in the direction in which the side slip angle β is generated (more specifically, the present steering-back direction of the steering wheel 11), to determine the moved position (hereinafter referred to as changed neutral position) of the rack bar 22 as a dynamic zero point δo, and to steer the left and right front wheels FW1 and FW2 while the changed neutral position (the dynamic zero point δo) is used as a reference. Therefore, the dynamic zero point δo can be represented by the following Eq. 12.

$$\delta o = -(1+Kr/Kf) \cdot \beta \cdot N \qquad \text{Eq. 12}$$

N in Eq. 12 represents a correction amount for treating, as linear, the deforming characteristic of the tires of the left and right front wheels FW1 and FW2, which changes non-linearly upon generation of the side slip angle β of the vehicle body. This correction amount N can be calculated as a function of the detected lateral acceleration G as shown in the following Eq. 13.

$$N = (a + b \cdot G^2)/(c + d \cdot G^2) \qquad \text{Eq. 13}$$

Notably, a, b, c, and d in Eq. 13 are constants determined in accordance with the vehicle model and the tires. Notably, the correction amount N is not limited to that calculated in accordance with Eq. 13, and may be previously set in accordance with the characteristics of the vehicle or may be freely changed by the driver. The electronic control unit 36 calculates the dynamic zero point δo by use of the lateral acceleration G and the side slip angle β input in the above-described step S11 and in accordance with the above-described Eqs. 12 and 13.

After calculation of the dynamic zero point δo, electronic control unit 36 executes steps S14 and S15 so as to steer the left and right front wheels FW1 and FW2 while using the calculated dynamic zero point δo as a reference. In other words, the electronic control unit 36 calculates a reaction torque Tz for guiding the direction of rotation of the steering wheel 11 by the driver. Calculation of this reaction torque Tz will now be described in detail.

As described above, the dynamic zero point δo is a reference point of the steering angle of the left and right front wheels FW1 and FW2 for stabilizing the turning behavior of the vehicle in a turning state, while eliminating the influence of the side slip angle β. That is, with the vehicle in a turning state, when the left and right front wheels FW1 and FW2 are steered with the dynamic zero point δo used as a reference, the turning behavior of the vehicle can be stabilized to the greatest degree. Therefore, in a state where the turning behavior of the vehicle becomes unstable due to generation of the side slip angle β of the vehicle body, the turning behavior of the vehicle must be stabilized by means of steering the left and right front wheels FW1 and FW2 while using the dynamic zero point δo as a reference.

Here, when the vehicle is turning leftward, as described above, a rightward side slip angle is generated, so that the side slip angle β of the vehicle body assumes a positive value. Therefore, the dynamic zero point δo assumes a negative value in accordance with the above-described Eq. 12. Further, when the vehicle is turning rightward, as described above, a leftward side slip angle is generated, so that the side slip angle β of the vehicle body assumes a negative value. Therefore, the dynamic zero point δo assumes a positive value in accordance with the above-described Eq. 12. Accordingly, when the left and right front wheels FW1 and FW2 are steered in different directions depending on whether the calculated dynamic zero point δo is positive or negative, the left and right front wheels FW1 and FW2 are steered (back) to the right when the dynamic zero point δo assumes a negative value and are steered (back) to the left when the dynamic zero point δo assumes a positive value.

Therefore, the electronic control unit 36 calculates a torque for steering (back) the left and right front wheels FW1 and FW2 steered through rotation of the steering wheel 11 by the driver, wile using the calculated dynamic zero point δo as a reference; that is, the electronic control unit 36 calculates the reaction torque Tz for guiding the steering wheel 11 toward the dynamic zero point δo against the steering torque t input by the driver.

For calculation of the reaction torque Tz, in step S14, the electronic control unit 36 first calculates a steering angle δa of the left and right front wheels FW1 and FW2 with the dynamic zero point δo used as a reference, in accordance with the following Eq. 14.

$$\delta a = \delta - \delta o \qquad \text{Eq. 14}$$

In Eq. 14, δ represents a steering angle detected by the steering angle sensor 33; i.e., a steering angle detected with the static zero point as a reference.

As described above, the steering angle δa calculated in accordance with Eq. 14 becomes equal to that detected with the detection reference point of the steering angle δ from the static zero point to the dynamic zero point δo. In other words, the steering angle δa is obtained by converting the steering angle δ, which the steering angle sensor 33 detected while using the static zero point as a reference, to a steering angle whose reference point is the dynamic zero point δo. In step S15, the electronic control unit 36 calculates the reaction torque Tz corresponding to the magnitude of the calculated (converted) steering angle δa.

Figure 3:
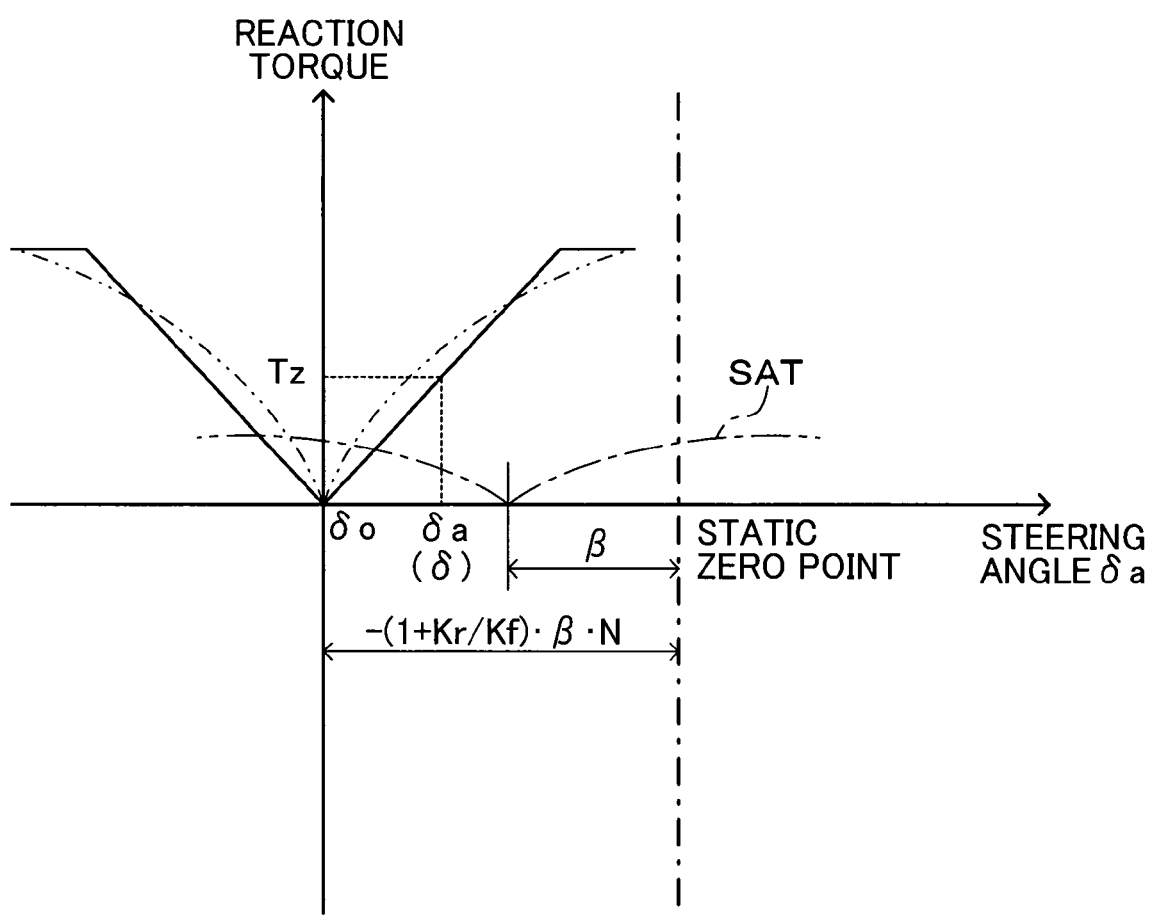
FIG. 3 is a graph showing the relation between steering angle and reaction torque.

As shown in FIG. 3, the reaction torque Tz is set to become "0" at the dynamic zero point δo and increase in proportion to an increase in the steering angle δa in the leftward or rightward direction; i.e., the absolute value of the steering angle δa. Specifically, when the absolute value of the steering angle δa is large; i.e., the absolute value of a difference between the detected steering angle δ and the dynamic zero point δo is large, a large reaction torque Tz is calculated. When the absolute value of the steering angle δa is small; i.e., the absolute value of the difference between the detected steering angle δ and the dynamic zero point δo is small, a small reaction torque Tz is calculated. Notably, the reaction torque Tz is set such that it assumes the maximum value in the vicinity of the maximum steering angle to which the left and right front wheels FW1 and FW2 can be steered (that is, the rack bar 22 can be moved in the axial direction).

Notably, the present embodiment employs the change characteristic of the reaction torque Tz such that it changes in proportion to the absolute value of the steering angle δa and assumes a constant value in the vicinity of the maximum steering angle. However, the present embodiment may employ a change characteristic (for example, an upwardly convex function curve) such that, as indicated by a two-dot chain line in FIG. 3, the reaction torque Tz uniformly increases with the steering angle δa and assumes the maximum value at the maximum steering angle.

Here, the reaction torque Tz applied to the steering wheel 11 will be described. In general, in an electric power steering apparatus, the reaction torque sum of viscous torque, inertial torque, and self-aligning torque (hereinafter simply referred to as SAT), which are present in the steering system, becomes equal to a steering torque sum of the steering torque t input by the driver and the assist torque Ta. In other words, the electric motor generates the assist torque Ta in accordance with the magnitude of the SAT, which changes with rotation of the steering wheel 11, such that the steering torque t input by the driver does not increase. An example of the viscous torque present in the steering system is a torque generated associated with flow resistance of oil charged in the steering gear unit 20. An example of the inertial torque is a torque generated associated with the inertial effect of the steering wheel 11.

Incidentally, in the present embodiment, in order to guide the steering wheel 11 with the dynamic zero point δo used as a reference, the electronic control unit 36 drives and controls the electric motor 23 so as to apply the reaction torque Tz to the steering wheel 11. Therefore, the reaction torque present in the steering system is the sum of the viscous torque, the inertial torque, the SAT, and the reaction torque Tz. That is, the SAT, which is naturally generated, as a road surface reaction, for rotation of the steering wheel 11 from the vehicle-body side slip angle β, as indicted by a single-dot chain line in FIG. 3, is superimposed on the reaction torque Tz, which is generated for rotation of the steering wheel 11 from the dynamic zero point δo, the reaction torque sum increases. Accordingly, the electronic control unit 36 properly adjusts the magnitude of the assist torque Ta through drive and control of the electric motor 23 in order to prevent the steering torque t from increasing.

Two methods are available for adjustment of the assist torque Ta by the electronic control unit 36; i.e., adjusting the assist torque Ta such that the assist torque Ta becomes equal to the sum of the viscous torque, the inertial torque, and the SAT; and adjusting the assist torque Ta such that the assist torque Ta becomes equal to the sum of the viscous torque, the inertial torque, the SAT, and the reaction torque Tz.

In the case where the electronic control unit 36 adjusts the assist torque Ta such that the assist torque Ta becomes equal to the sum of the viscous torque, the inertial torque, and the SAT, the reaction torque Tz becomes equal to the steering torque t. In other words, the steering wheel 11 can be guided with the dynamic zero point δo used as a reference, by means of the reaction torque Tz transmitted to the steering wheel 11 via the rack bar 22, the pinion gear 21, and the steering shaft 12. Notably, in this case, in a situation where the steering torque t is not input by the driver, the electronic control unit 36 drives and controls the electric motor 23; i.e., adjusts the assist torque Ta, such that the viscous torque becomes equal to the reaction torque Tz, to thereby return the steering wheel 11 to the dynamic zero point δo.

In the case where the electronic control unit 36 adjusts the assist torque Ta such that the assist torque Ta becomes equal to the sum of the viscous torque, the inertial torque, the SAT, and the reaction torque Tz, the sum of the SAT and the reaction torque Tz becomes equal to the steering torque t. In this state, the steering wheel 11 is guided to the direction of the side slip angle β of the vehicle body by means of the SAT transmitted to the steering wheel 11 via the rack bar 22, the pinion gear 21, and the steering shaft 12, and is guided toward the dynamic zero point δo by means of the reaction torque Tz transmitted to the steering wheel 11 in a similar manner.

Incidentally, in the case where the SAT and the reaction torque Tz are applied to the steering wheel 11 in a superimposed manner, in some cases, the steering torque t changes non-continuously with rotation of the steering wheel 11. That is, since the sum of the SAT and the reaction torque Tz is equal to the steering torque t, the steering torque t becomes small (a so-called torque dip is generated) at a rotational position of the steering wheel 11 where the SAT becomes "0" (a rotational position corresponding to the side slip angle β) and a rotational position of the steering wheel 11 where the reaction torque Tz becomes "0" (a rotational position corresponding to the dynamic zero point δo).

In this case, the influence of the torque dip by the SAT can be mitigated by setting the reaction torque Tz to have a magnitude sufficiently larger than that of the SAT. In the case where the influence of the torque dip is reduced, the steering torque t changes slightly at the rotational position of the steering wheel 11 where the SAT becomes "0." In other words, since at the rotational position of the steering wheel 11 where the steering torque t changes, the left and right front wheels FW1 and FW2 are steered to the direction of the side slip angle β, the driver readily knows, on the basis of a change in the steering torque t, that the steered direction of the left and right front wheels FW1 and FW2 coincides with the heading direction of the vehicle.

The electronic control unit 36 calculates the reaction torque Tz to be generated in the electric motor 23 by use of the steering angle δa calculated in accordance with the above-described Eq. 14, and with reference to the characteristic table shown in FIG. 3 for the reaction torque Tz. Upon completion of calculation of the reaction torque Tz, the electronic control unit 36 proceeds to step S16.

In step S16, the electronic control unit 36 drives and controls the electric motor 23 of the steering gear unit 20 so as to generate the reaction torque Tz calculated in the above-described step S13.

The drive and control for generating the reaction torque Tz will be described specifically. The electronic control unit 36 inputs, from the steering torque sensor 32, the detected torque T acting on the steering shaft 12 (that is, the rack bar 22). The electronic control unit 36 then feedback-controls the rotation of the electric motor 23 such that the detected torque T coincides with the calculated reaction torque Tz. Further, the electronic control unit 36 inputs, from the drive circuit 37, the drive current flowing through the electric motor 23, and feedback-controls the drive circuit 37 such that a drive current having a magnitude corresponding the reaction torque Tz flows properly.

As a result of the electric motor 23 being driven and controlled in this manner, the reaction torque Tz is generated by the electric motor 23 and is transmitted. Further, as a result of the reaction torque Tz being transmitted to the rack bar 22, the reaction torque Tz is transmitted to the steering wheel 11 via the steering shaft 12. Thus, the steering wheel 11 is rotated (guided) by means of the reaction force generated with the dynamic zero point δo used as a reference.

When the torque T detected by the steering torque sensor 32 becomes equal to the calculated reaction torque Tz, the electronic control unit 36 stops the drive and control of the electric motor 23, and proceeds to step S17. In step S17, the electronic control unit 36 ends the current execution of the reaction-torque control program. After elapse of the predetermined short interval, execution of the same program is started again.

As can be understood from the above description as well, according to the present embodiment, the electronic control unit 36 can calculate, in the above-described step S13, the dynamic zero point δo (second reference point) in relation to the static zero point (first reference point) in accordance with the above-described Eq. 12, the dynamic zero point δo changing in accordance with the side slip angle β of the vehicle body detected by the side slip angle sensor 35. Further, in the above-described step S14, the electronic control unit 36 can convert the steering angle δ, detected by the steering angle sensor 33 with the static zero point as a reference, to the steering angle δa, which is a corresponding steering angle when the dynamic zero point δo is used as a reference, in accordance with the above-described Eq. 14. Moreover, in the above-described step S15, the electronic control unit 36 can calculate the reaction torque Tz which has a predetermined relation with the steering angle δa obtained through the above-described conversion. Subsequently, in above-described step S16, the electronic control unit 36 can drive and control the electric motor 23 via the drive circuit 37 in such a manner that the calculated reaction torque Tz is generated.

As a result of the reaction torque Tz being generated in this manner, the steering wheel 11 integrally assembled to the steering shaft 12 connected to the steering gear unit 20 is rotated (guided) by means of the reaction force generated with the dynamic zero point δo used as a reference. With this control, for example, even when the vehicle travels on a snowy road, an icy road, or a like road which provides small road surface reaction force, it is possible to generate the reaction torque Tz which the driver can sense without fail, and to inform (guide) the driver, by means of the generated reaction torque Tz, a direction in which the driver must rotate the steering wheel 11.

Accordingly, in particular, even when a driver who is not well acquainted with driving a vehicle travels on a snowy road or an icy road, the driver can easily determine the direction in which the steering wheel 11 is to be rotated so as to stabilize the behavior of the vehicle in a turning state; i.e., the direction of a rotating operation toward the dynamic zero point δo. This enables the driver to properly correct the operation of rotating the steering wheel 11 so as to stabilize the behavior of the vehicle during turning, and to quite easily cause the vehicle to turn while traveling.

Moreover, as is apparent from the above-described Eq. 12, the dynamic zero point δo can be calculated by multiplying the side slip angle β of the vehicle body by a coefficient calculated by use of the cornering powers Kf and Kr acting toward the turning center of the vehicle, and the correction term N, which is calculated in consideration of the deforming characteristic of the tires, which changes non-linearly with the side slip angle β of the vehicle body as represented by the above-described Eq. 13. The correction term N is a function of the lateral acceleration G. Thus, it becomes possible to optimally calculate the dynamic zero point δo in accordance with the turning state of the vehicle; i.e., the generated side slip angle β of the vehicle body, whereby the steering wheel 11 is guided with the dynamic zero point δo used as a reference, and thus, the driver can quite easily cause the vehicle to turn, while traveling, in a more stable manner.

When the turning behavior of the vehicle becomes unstable in a state where the absolute value of the steering angle δa is large, a large reaction torque Tz can be generated. Since the rotation direction of the steering wheel 11 can be guided by means of the generated large reaction torque Tz, the driver can quickly and properly correct the operation of rotating the steering wheel 11. Further, since the magnitude of the reaction torque Tz can be set freely, the reaction torque Tz can be increased in relation to the magnitude of the absolute value of the steering angle δa such that the driver easily steers the steering wheel 11; i.e., the driver easily controls the turning state of the vehicle. This enables the reaction torque Tz to increase to a greater degree in relation to the magnitude of the absolute value of the steering angle δa in accordance with the characteristic of the vehicle. For example, in the case of a sporty car, the reaction torque Tz is increased to a greater degree in relation to the magnitude of the absolute value of the steering angle δa so as to enable quick correction of the rotating operation of the steering wheel 11 during sporty driving.

Furthermore, in the above-described embodiment, the electric motor 23 is driven through calculation of the dynamic zero point δo for the static zero point and calculation of the reaction torque Tz with the dynamic zero point δo used as a reference. This can be implemented through drive of the electric motor to generate the reaction torque Tz in a conventional electric power steering apparatus without provision of an additional apparatus or mechanism. Accordingly, the present invention can be quite easily applied to a conventional electric power steering apparatus, whereby production cost can be reduced.

In the above-described embodiment, as shown in the above-described Eq. 12, the dynamic zero point δo is calculated by use of the cornering power Kf of the front wheels, the cornering power Kr of the rear wheels, and the correction amount N for correction for the deformation characteristic of the tires of the left and right front wheels FW1 and FW2, which changes in accordance with the turning condition of the vehicle. The correction amount N is used because the cornering powers Kf and Kr of the front and rear wheels are assumed to be constant irrespective of change in the deformation characteristic of the tires; i.e., irrespective of change in the turning condition of the vehicle. Accordingly, the correction amount N can be omitted when the cornering powers Kf and Kr of the front and rear wheels are calculated as values which change in accordance with the turning condition of the vehicle.

This modified embodiment will be described below. Those portions identical with those of the above-described embodiment are denoted by the same reference numbers and symbols, and their detailed descriptions will not be repeated.

As mentioned in the above-described embodiment, when the steering wheel 11 is rotated by the driver, the left and right front wheels FW1 and FW2 are steered to, for example, a steering angle δc. As a result, the vehicle changes its state from a straight travel state to a turning state, or maintains the turning state. A centripetal force as shown by the above-described Eq. 7 and a centrifugal force act on the vehicle in the turning state, as described above.

Incidentally, the front and rear wheels (the so-called unsprung side) and the vehicle body (the so-called sprung side) are connected together by a suspension apparatus such that they move in the vertical direction in relation to each other. Therefore, when an inertial force (centrifugal force)

associated with a lateral motion of the vehicle acts on the center of gravity of the vehicle body in particular in a turning state, the vehicle body inclines toward the direction in which the inertial force acts; in other words, the vehicle body rolls. In a state where the vehicle body rolls, in other words, where a roll angle φ is generated in the vehicle body, on each of the front-wheel side and the rear-wheel side, the load acting on one of the left and right wheels increases, and the load acting on the other wheel decreases. Therefore, when the vehicle is in a turning state, the cornering powers Kf and Kr must be calculated in consideration of a load shift caused by the generated rolling.

That is, in the present modified embodiment, the cornering powers Kf and Kr of the front and rear wheels of the vehicle which turns with a lateral acceleration G are calculated in accordance with the following Eqs. 15 and 16.

$$Kf = Kfo + \xi \cdot ((Nf \cdot \phi + mf \cdot hf \cdot G)/Tr)^2 \quad \text{Eq. 15}$$

$$Kr = Kro + \xi \cdot ((Nr \cdot \phi + mr \cdot hr \cdot G)/Tr)^2 \quad \text{Eq. 16}$$

Kfo in Eq. 15 and Kro in Eq. 16 respectively represent the cornering powers of the front and rear wheels for the front and rear axle loads at the time when the vehicle is at rest (hereinafter, the loads will be refereed to as rest-state loads). Further, in Eqs. 15 and 16, Nf and Nr represent a front-wheel-side roll rigidity value and a rear-wheel-side roll rigidity value, respectively; mf and mr represent a front-wheel-side vehicle body mass and a rear-wheel-side vehicle body mass, respectively; and hf and hr represent front-wheel-side and rear-wheel-side distances (heights) respectively, as measured between a road surface and the corresponding rolling center. Further, in Eqs. 15 and 16, ξ represents a load dependency coefficient of cornering power, φ represents a roll angle of the vehicle body, and Tr represents the tread width of the front and rear wheels.

Here, the load shift associated with generation of rolling will be described. The roll angle φ generated in a vehicle which turns with a lateral acceleration G can be calculated in accordance with the following Eq. 17.

$$\phi = (m \cdot Gd \cdot hs)/(Nf + Nr - m \cdot g \cdot hs) \quad \text{Eq. 17}$$

In Eq. 17, m represents a sprung mass, and hs represents a distance between the center of gravity of the vehicle and the roll center.

The amount of a lateral load shift of the front and rear wheels can be calculated as the sum of a load shift depending on the roll angle φ and a load shift caused by a lateral force acting on the roll center. Therefore, when the rest-state loads of the front and rear wheels are represented by Fo and Ro, the loads Ff and Fr of the front and rear wheels after the load shift can be represented by the following Eqs. 18 and 19.

$$Ff = Fo \pm (Nf \cdot \phi + mf \cdot hf \cdot G)/Tr \quad \text{Eq. 18}$$

$$Fr = Ro \pm (Nr \cdot \phi + mr \cdot hr \cdot G)/Tr \quad \text{Eq. 19}$$

Meanwhile, cornering powers Kf and Kr when the loads Ff and Fr act on the front and rear wheels can be represented by the following Eqs. 20 and 21.

$$Kf = Ff \cdot (nCp + \xi \cdot (Ff - Fzo)) \quad \text{Eq. 20}$$

$$Kr = Fr \cdot (nCp + \xi \cdot (Fr - Fzo)) \quad \text{Eq. 21}$$

In Eqs. 20 and 21, nCp is a cornering power coefficient obtained by dividing the cornering power Kf, Kr by a load at a given moment and represents a normalized cornering power coefficient at the time of a standard load. Further, Fzo in Eqs. 20 and 21 represents a predetermined standard load.

When the above-described Eqs. 18 and 19 are substituted for Eqs. 20 and 21, and the resultant equations are simplified while the cornering powers of the front and rear wheels at the rest-state loads are represented by Kfo and Kro, the above-described Eqs. 15 and 16 can be derived. As described above, in the cornering powers Kf and Kr calculated in accordance with the above-described Eqs. 15 and 16, the roll angle φ generated in the vehicle body is taken into consideration. Therefore, the cornering powers Kf and Kr can be calculated as proper values which reflect the turning condition of the vehicle. This enables accurate calculation of the dynamic zero point δo by eliminating the correction amount N from the above-described Eq. 12. Accordingly, effects similar to those provided by the above-described embodiment can be attained.

The present invention is not limited to the above-described embodiment and the modification thereof, and can be modified in various manners without departing from the object of the present invention.

For example, in the above-described embodiment and the modification thereof, the steering wheel 11 and the steering gear unit 20 are connected by means of the steering shaft 12, and a displacement of the rack bar 22 toward the dynamic zero point δo caused by the electric motor 23 is transmitted directly to the steering wheel 11. Thus, the steering wheel 11 is guided to a direction of rotational operation corresponding to the dynamic zero point δo, whereby the driver can quite easily sense a steering direction of the left and right front wheels FW1 and FW2 for stabilizing the turning behavior of the vehicle.

Figure 4:
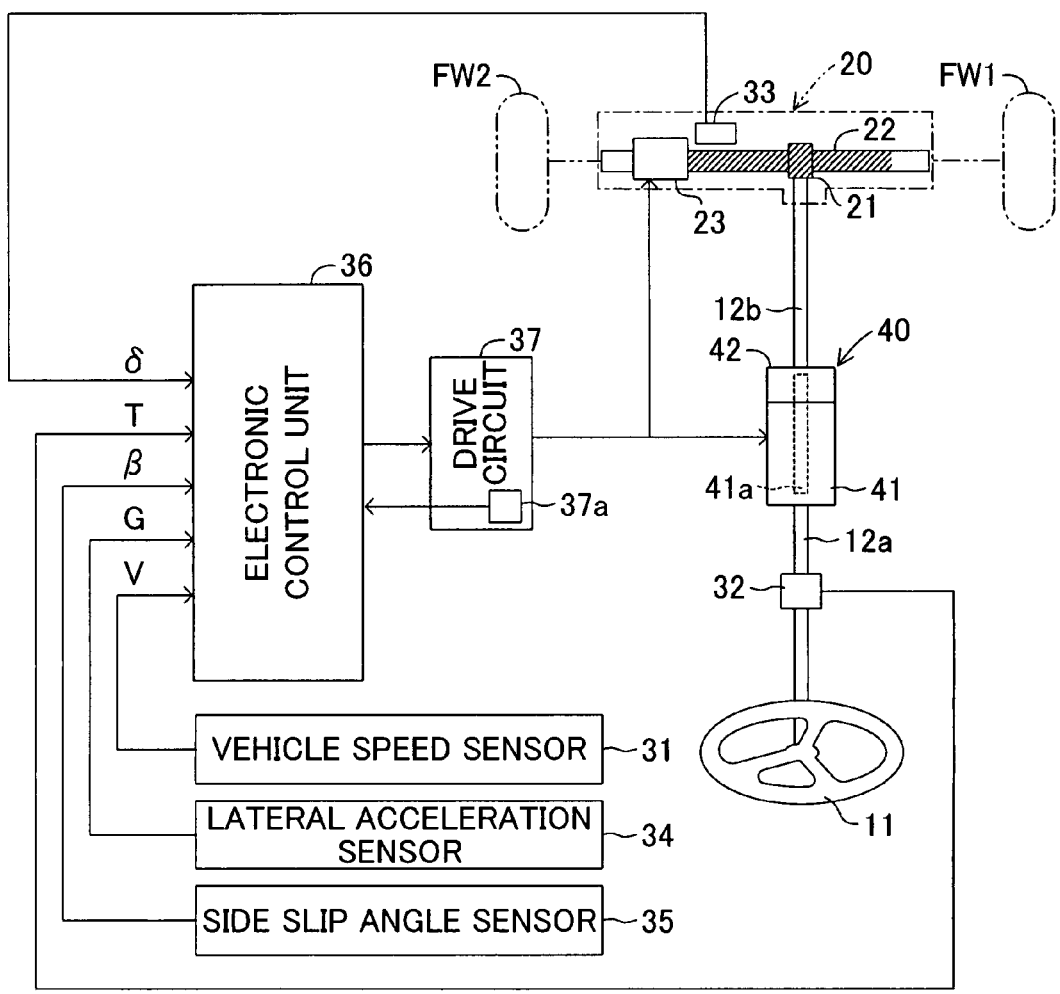
FIG. 4 is a schematic diagram of a steering apparatus for a vehicle according to a modified embodiment of the present invention.

However, in a case where the steering angle δ of the left and right front wheels FW1 and FW2 detected by means of the steering angle sensor 33 greatly separates from the dynamic zero point δo; i.e., when the absolute value of the steering angle δa is large, in some cases, the rotational amount of the steering wheel 11 corresponding to the axial displacement of the rack bar 22 to the dynamic zero point δo increases, and consequently, the driver feels an unnatural sensation. In order to cope with this problem, the present invention can be practiced, with provision of a variable gear mechanism 40 as shown in FIG. 4. The variable gear mechanism 40 provides a relative displacement between a displacement of the steering wheel 11 in the rotation direction and a displacement of the rack bar 22 in the axial direction. Notably, since the structure and operation of the variable gear mechanism 40 are known, their detailed descriptions will not be repeated.

In this case, in the electric power steering apparatus, which severs as the steering apparatus for a vehicle, the steering shaft 12 of the above-described embodiment is composed of a steering input shaft 12a which is rotatable together with the steering wheel 11, and a steering output shaft 12b connected to the steering gear unit 20. The variable gear mechanism 40 connects the steering input shaft 12a and the steering output shaft 12b with each other. The variable gear mechanism 40 includes an electric motor 41 and a reducer 42. The variable gear mechanism 40 properly changes the amount of rotation of the steering output shaft 12b connected to the reducer 42, in relation to the amount of rotation of the steering input shaft 12a.

The housing of the electric motor 41 is integrally connected to the steering input shaft 12a, and rotates unitarily therewith when the steering wheel 11 is rotated by the driver. A drive shaft 41a of the electric motor 41 is connected to the reducer 42, so that rotational force of the electric motor 41 is transmitted to the reducer 42 via the drive shaft 41a. The reducer 42 is composed of a predetermined gear mechanism (e.g., a planetary gear mechanism or the like), and the steering output shaft 12b is connected to the gear mechanism. By virtue of this configuration, the variable gear actuator 40 connects the steering input shaft 12a and the steering output shaft 12b via the drive shaft 41a of the electric motor 41 and the reducer 42 such that the steering input shaft 12a and the steering output shaft 12b can rotate in relation to each other, and can properly change the ratio between the rotational amount of the steering input shaft 12a and the rotational amount of the steering output shaft 12b.

Accordingly, when the left and right front wheels FW1 and FW2 are steered by means of the reaction torque Tz, the rotational amount of the steering wheel 11 can be reduced by means of changing the ratio of the rotational amount of the steering input shaft 12a to the rotational amount of the steering output shaft 12b, whereby the unnatural sensation that the driver feels can be reduced. Notably, the other effects in this case are expected to be similar to those attained in the above-described embodiment and the modification thereof.

Figure 5:
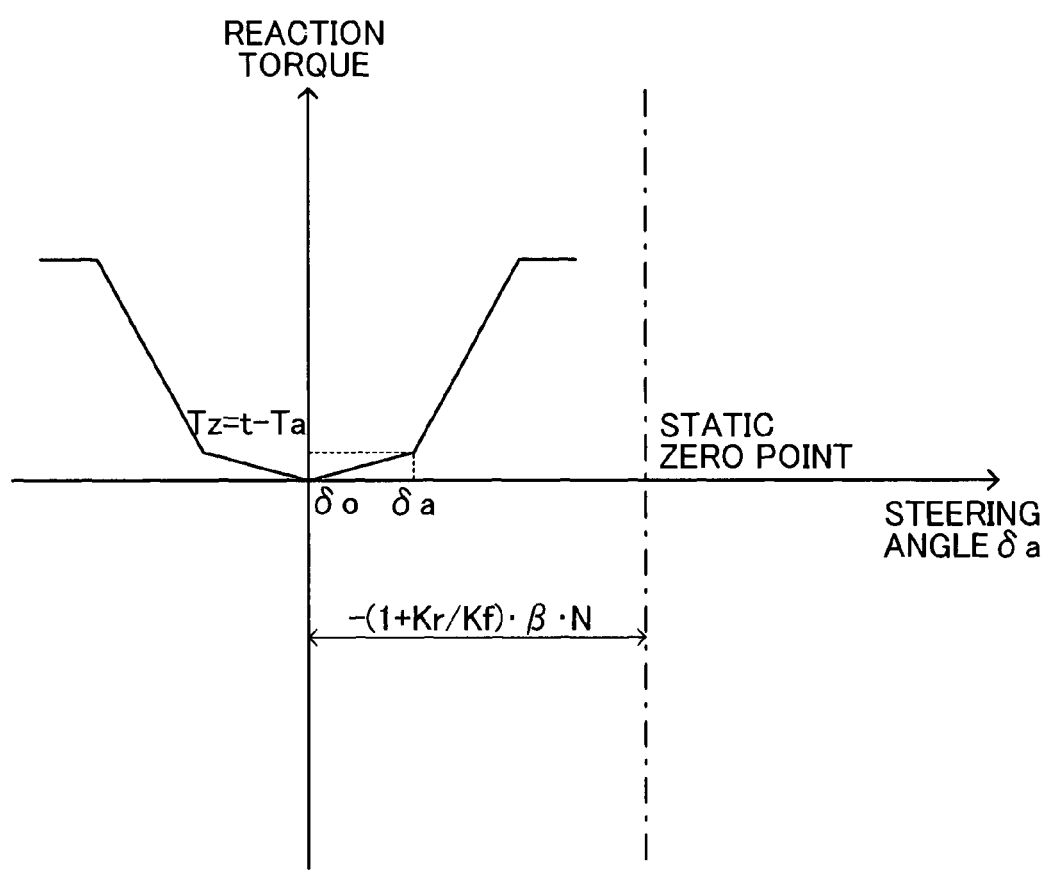
FIG. 5 is a graph relating to the modified embodiment of the present invention and showing the relation between steering angle and reaction torque.

In the above-described embodiment and the modification thereof, the present invention is implemented in such a manner that the reaction torque Tz changes in proportion to a change in the absolute value of the steering angle δa. However, the present invention can be implemented in such a manner that the reaction torque Tz is changed stepwise in accordance with, for example, the magnitude of the absolute value of the steering angle δa, as shown in FIG. 5.

By virtue of this configuration, a small reaction torque Tz is applied to the steering wheel 11 during ordinary travel, because the generated side slip angle β of the vehicle body is small. Thus, the driver can drive without feeling an unnatural sensation. Notably, the small reaction torque Tz applied in such a manner can be determined, for example, such that the reaction torque Tz becomes equal to the difference (t−Ta) between the steering torque t that the driver inputs via the steering wheel 11 and the assist torque Ta that the electric motor 23 applies. Thus, the driver can drive the vehicle without feeling an unnatural sensation against the reaction torque Tz applied during the ordinary travel. Meanwhile, in a case where an unexpected large side slip angle β of the vehicle body is generated during high-speed travel or the like and the turning behavior of the vehicle becomes unstable, a larger reaction torque Tz can be applied to the steering wheel 11, whereby the driver can quickly correct the operation of rotating the steering wheel 11.

In the above-described embodiment and modification thereof, the present invention is implemented in such a manner that the side slip angle sensor 35 detects the side slip angle β of the vehicle body by performing the calculation of the above-described Eq. 1 which uses vehicle speeds Vx and Vy detected by detectors. Alternatively, in a case where an acceleration sensor for detecting a lateral acceleration α (corresponding to the centripetal acceleration α) generated in the vehicle and a yaw rate sensor for detecting a yaw rate ω are mounted on the vehicle, the present invention can be implemented to detect the side slip angle β of the vehicle body by use of the values detected by these sensors. In this case, preferably, the side slip angle β of the vehicle body is calculated in accordance with the following Eq. 22.

$$\beta = \int (\omega - \alpha/V) dt \qquad \text{Eq. 22}$$

V in Eq. 22 represents the vehicle speed V detected by the vehicle speed sensor 31.

By virtue of this configuration, it becomes unnecessary to provide an additional detector as in the above-described embodiment and the modification thereof, although the detection accuracy of the side slip angle β of the vehicle body decreases slightly because of a time lag in generation of the lateral acceleration α and the yaw rate ω and other factors. Therefore, the production cost of the steering apparatus can be reduced.

In the above-described embodiment and modification thereof, the present invention is implemented in such a manner that a rack-and-pinion type steering gear unit is used as the steering gear unit 20. However, the present invention may be implemented in such a manner that a ball-screw mechanism is employed as the steering gear unit. Further, the present invention is implemented in such a manner that the electric motor 23 is assembled to the steering gear unit 20 so as to transmit the drive force of the electric motor 23 to the rack bar 22. However, the present invention may be implemented in such a manner that the drive force of the electric motor 23 is transmitted to the sheering shaft 12.

The invention claimed is:

1. A steering apparatus for a vehicle which includes a steering wheel rotated by a driver, a steering shaft which rotates together with the steering wheel, a steering unit which mutually connects the steering shaft and steerable wheels of the vehicle and steers the steerable wheels in accordance with rotation of the steering shaft, and an electric motor which applies a predetermined torque to the steering operation of the steerable wheels, the steering apparatus comprising:

a steering angle detection unit which detects a first steering angle of the steerable wheels which are steered in accordance with rotation of the steering wheel based on a first reference point for maintaining the vehicle in a straight travel state;

a side-slip-angle detection unit which detects a side slip angle of a body of the vehicle generated when the vehicle is in a turning state;

a reference-point calculation unit which calculates a second reference point which changes in accordance with the detected side slip angle of the vehicle body and is used for determining a second steering angle for causing the vehicle to turn while reducing an influence of a lateral force on the turning state of the vehicle, the lateral force being generated in the vehicle due to the side slip angle of the vehicle body;

a steering angle conversion unit which converts the first steering angle of the steerable wheels detected by the steering angle detection unit based on the first reference point to the second steering angle based on the second reference point;

a reaction-torque calculation unit which calculates a reaction torque based on a predetermined relation with the second steering angle, the reaction torque acting in a direction for causing the second steering angle to coincide with the second reference point; and a drive-control unit which controls rotating and driving of the electric motor so as to generate the calculated reaction torque.

2. A steering apparatus for a vehicle according to claim 1, wherein the reference-point calculation unit calculates the second reference point by multiplying the detected side slip angle of the vehicle body by a coefficient and a correction term, where the coefficient is calculated based on cornering forces acting toward a turning center of the vehicle on the basis of friction forces between a road surface and tires attached to the front and rear wheels of the vehicle in the turning state, and the correction term is determined based on deforming characteristic of the tires, which changes non-linearly with the detected side slip angle of the vehicle body.

3. A steering apparatus for a vehicle according to claim 2, further comprising a lateral-acceleration detection unit which detects a lateral acceleration of the vehicle, wherein the correction term is determined based on the lateral acceleration of the vehicle detected by the lateral-acceleration detection unit.

4. A steering apparatus for a vehicle according to claim 1, wherein the reference-point calculation unit calculates the second reference point by multiplying the detected side slip angle of the vehicle body by a coefficient which uses cornering forces acting toward a turning center of the vehicle which are calculated based on a lateral acceleration generated when the vehicle is in a turning state, a roll angle representing the degree of rolling of the vehicle body occurred as a result of turning of the vehicle, and an amount of a load shift due to the rolling occurred in the vehicle body.

5. A steering apparatus for a vehicle according to claim 1, wherein the predetermined relation between the reaction torque and the second steering angle is a relation in which the reaction torque increases with an increase in the absolute value of the second steering angle.

6. A steering apparatus for a vehicle according to claim 5, wherein the predetermined relation between the reaction torque and the second steering angle is such that the reaction torque changes in proportion to a change in the absolute value of the second steering angle.

7. A steering apparatus for a vehicle according to claim 1, wherein
the steering shaft includes a steering input shaft which rotates together with the steering wheel and a steering output shaft connected to the steering unit; and
the steering input shaft and the steering output shaft are connected by a variable gear mechanism which changes a rotational amount of the steering output shaft in relation to a rotational amount of the steering input shaft.

8. A steering apparatus for a vehicle according to claim 1, wherein the predetermined relation between the reaction torque and the second steering angle is a relation in which the reaction torque increases stepwise with an increase in the absolute value of the second steering angle.

9. A steering apparatus for a vehicle according to claim 1, wherein the side-slip-angle detection unit detects the side slip angle of the vehicle body based on a vehicle speed in the fore-aft direction of the vehicle and a vehicle speed in the lateral direction of the vehicle detected by use of light or sound.

10. A steering apparatus for a vehicle according to claim 1, wherein the side-slip-angle detection unit includes:
a yaw-rate sensor which detects a yaw rate of the vehicle;
an acceleration sensor which detects a lateral acceleration of the vehicle;
a vehicle speed sensor which detects a speed of the vehicle; and
a side-slip-angle calculation unit which calculates the side slip angle of the vehicle body based on the detected yaw rate, lateral acceleration, and vehicle speed.

11. A method of operating a steering apparatus of vehicle which includes a steering wheel rotated by a driver, a steering shaft which rotates together with the steering wheel, a steering unit which mutually connects the steering shaft and steerable wheels of the vehicle and steers the steerable wheels in accordance with rotation of the steering shaft, and an electric motor which applies a predetermined torque to the steering operation of the steerable wheels, the method comprising:
detecting a first steering angle of the steerable wheels based on a first reference point for maintaining the vehicle in a straight line travel;
detecting a side slip angle of a body of the vehicle;
calculating a second reference point based on the detected side slip angle of the body of the vehicle;
converting the first steering angle based on the first reference point to a second steering angle based on the second reference point, such that the second steering angle causes the vehicle to turn while reducing an influence of a lateral force on the turning state of the vehicle, the lateral force is generated in the vehicle due to the side slip angle of the vehicle body;
calculating a reaction torque based on the second steering angle; and
controlling the electric motor so as to generate the calculated reaction torque.

12. A method according to claim 11, wherein the second reference point is calculated by multiplying the detected side slip angle of the vehicle body by a coefficient and a correction term, where the coefficient is calculated based on cornering forces acting toward a turning center of the vehicle on the basis of friction forces between a road surface and tires attached to the front and rear wheels of the vehicle in the turning state, and the correction term is determined based on deforming characteristic of the tires, which changes non-linearly with the detected side slip angle of the vehicle body.

13. A method according to claim 12, further comprising detecting a lateral acceleration of the vehicle, and determining the correction term based on the detected lateral acceleration of the vehicle.

14. A method according to claim 11, wherein the second reference point is calculated by multiplying the detected side slip angle of the vehicle body by a coefficient which uses cornering forces acting toward a turning center of the vehicle which are calculated based on a lateral acceleration generated when the vehicle is in a turning state, a roll angle representing the degree of rolling of the vehicle body occurred as a result of turning of the vehicle, and an amount of a load shift due to the rolling occurred in the vehicle body.

15. A method according to claim 11, wherein the side slip angle of the vehicle body is detected based on a vehicle speed in the fore-aft direction of the vehicle and a vehicle speed in the lateral direction of the vehicle detected by use of light or sound.

16. A method according to claim 11, wherein the side slip angle is calculated based on a detected yaw rate of the vehicle, a detected lateral acceleration of the vehicle, and a detected speed of the vehicle.

* * * * *